(12) United States Patent
Murakami et al.

(10) Patent No.: US 7,793,984 B2
(45) Date of Patent: Sep. 14, 2010

(54) SEAT BELT RETRACTOR AND SEAT BELT APPARATUS

(75) Inventors: Daisuke Murakami, Tokyo (JP); Koji Inuzuka, Tokyo (JP); Koji Tanaka, Tokyo (JP); Masato Takao, Tokyo (JP)

(73) Assignee: Takata Corporation, Tokyo (JP)

( * ) Notice: Subject to any disclaimer, the term of this patent is extended or adjusted under 35 U.S.C. 154(b) by 209 days.

(21) Appl. No.: 12/216,023

(22) Filed: Jun. 27, 2008

(65) Prior Publication Data

US 2009/0050728 A1 Feb. 26, 2009

(30) Foreign Application Priority Data

Aug. 24, 2007 (JP) .............................. 2007-218475

(51) Int. Cl.
*B60R 22/34* (2006.01)

(52) U.S. Cl. .................................... 280/807; 242/390.8

(58) Field of Classification Search ................. 280/807; 242/390.8; 297/474, 475
See application file for complete search history.

(56) References Cited

U.S. PATENT DOCUMENTS

| | | | | | |
|---|---|---|---|---|---|
| 4,489,804 | A | * | 12/1984 | Kamijo | 180/268 |
| 4,669,680 | A | * | 6/1987 | Nishimura et al. | 242/375.3 |
| 4,787,569 | A | * | 11/1988 | Kanada et al. | 242/371 |
| 4,896,844 | A | * | 1/1990 | Gavagan et al. | 280/807 |
| 5,765,774 | A | | 6/1998 | Maekawa et al. | |
| 6,447,012 | B2 | | 9/2002 | Peter et al. | |
| 6,827,308 | B2 | * | 12/2004 | Fujii et al. | 242/390.9 |
| 6,832,782 | B2 | * | 12/2004 | Mori | 280/806 |
| 6,908,112 | B2 | * | 6/2005 | Yano et al. | 280/805 |
| 7,080,800 | B2 | * | 7/2006 | Fujii et al. | 242/390.9 |
| 7,673,905 | B2 | * | 3/2010 | Fujii et al. | 280/806 |
| 2003/0209900 | A1 | * | 11/2003 | Tobata | 280/807 |
| 2006/0273212 | A1 | * | 12/2006 | Mori et al. | 242/390.8 |
| 2007/0114775 | A1 | | 5/2007 | Inuzuka et al. | |
| 2008/0105777 | A1 | | 5/2008 | Holbein et al. | |
| 2008/0174098 | A1 | * | 7/2008 | Takao et al. | 280/807 |
| 2008/0231036 | A1 | * | 9/2008 | Takao et al. | 280/807 |
| 2008/0238076 | A1 | * | 10/2008 | Takao et al. | 280/807 |
| 2009/0058063 | A1 | * | 3/2009 | Takao et al. | 280/807 |

FOREIGN PATENT DOCUMENTS

| | | |
|---|---|---|
| JP | 8-40204 | 2/1996 |
| JP | 9-272401 | 10/1997 |

(Continued)

*Primary Examiner*—Paul N Dickson
*Assistant Examiner*—Drew Brown
(74) *Attorney, Agent, or Firm*—Foley & Lardner LLP

(57) ABSTRACT

A seatbelt retractor integrated with an electronic control unit. A motor is disposed above both side walls of a frame and on the same side as a spool with respect to a back board. The motor is detachably fixed to at least one of the back board and the both side walls and of the frame. The ECU is detachably mounted to an upper stay extending upward from the back board of the frame and to be mounted to the vehicle body. In this manner, the motor and the ECU are integrated with a seatbelt retractor. Since the ECU is mounted to the upper stay, the weight of the ECU is dispersed not only to the main body of the seatbelt retractor but also to the upper stay. Thus, the vibration of the seatbelt retractor may be reduced.

8 Claims, 10 Drawing Sheets

FOREIGN PATENT DOCUMENTS

| | | |
|---|---|---|
| JP | 2000-135969 | 5/2000 |
| JP | 2001-130377 | 5/2001 |
| JP | 2001-187561 | 7/2001 |
| JP | 2001-199309 | 7/2001 |
| JP | 2007-145079 | 6/2007 |

* cited by examiner

US 7,793,984 B2

SEAT BELT RETRACTOR AND SEAT BELT APPARATUS

BACKGROUND

The present application relates to the technical field of a seatbelt retractor for the retraction and withdrawal of a seatbelt by rotating a spool with an electric motor and a seatbelt unit having the same. More specifically, the present application relates to a seatbelt retractor in which the electric motor is controlled by an electronic control unit (ECU) and to a seatbelt unit using the same.

Conventional seatbelt units mounted to vehicles, such as cars, restrain occupants with seatbelts in an emergency, such as a car crash, to restrain the occupants in the seats. Such seatbelt units are provided with a seatbelt retractor for retracting the seatbelt. When not in use, the seatbelt is retracted by a spool; and when in use, it is drawn out and worn by the occupants. In an emergency, as described above, the locking mechanism of the seatbelt retractor is activated to stop the rotation of the spool in the belt withdrawing direction, thereby stopping the withdrawal of the seatbelt, thus, restraining the occupant in an emergency.

Conventional seatbelt retractors are generally disposed in a confined space in vehicles such as in a center pillar. In this case, vehicle components such as center pillars have an opening for the seatbelt retractor.

If the circuit board is simply integrated with the seatbelt retractor, the inertial mass of the seatbelt retractor can be large. Therefore, when vibration is applied, the seatbelt retractor can vibrate with large amplitude.

Therefore, it would be desirable to provide a seatbelt retractor that can be prevented from vibrating with large amplitude even if it is integrated with an electronic control unit, and a seatbelt unit having the same.

SUMMARY

One disclosed embodiment is directed to a seatbelt retractor including at least a frame having a back board and both side walls extending from both side rims of the back board; a spool rotatably supported by the frame, the spool retracting a seatbelt; a motor for rotating the spool; and an electronic control unit for controlling the driving of the motor is characterized in that the electronic control unit is disposed above both side walls of the frame.

A seatbelt retractor may include an electronic control unit is mounted to an upper stay at the upper part of the frame to be mounted to the vehicle body.

A seatbelt retractor according an embodiment is configured so that the electronic control unit is disposed beside the upper stay adjacent to the interior of the vehicle cabin or the exterior of the vehicle cabin.

A seatbelt retractor according to another embodiment is configured so that the upper stay includes a belt guide for guiding the seatbelt.

A seatbelt unit according to another embodiment includes at least a seatbelt retractor for performing at least one of retraction and withdrawal of a seatbelt by rotating a spool by a motor; a tongue slidably supported by the seatbelt that is withdrawn from the seatbelt retractor; and a buckle to be detachably engaged with the tongue, wherein the seatbelt restrains the occupant by the engagement of the tongue and the buckle.

The seatbelt retractor has an electronic control unit above the both side walls of the frame. Therefore, the electronic control unit can be disposed close to the vehicle mounting position at the upper part of the seatbelt retractor. Accordingly, in the seatbelt retractor integrated with the electronic control unit, the weight of the electronic control unit can be dispersed not only to the main body of the seatbelt retractor but also to the vehicle mounting position at the upper part of the seatbelt retractor. This can reduce the weight of the seatbelt retractor even when the electronic control unit is integrated with the seatbelt retractor. As a result, even if vibration is applied to the seatbelt retractor integrated with the electronic control unit, so that the seatbelt retractor vibrates, the vibration can be reduced. In this way, the vibration of the seatbelt retractor can be reduced.

Since the electronic control unit is mounted to the upper stay of the frame to be mounted to the vehicle body, the structure can be simplified, so that even when integrated with the electronic control unit, the seatbelt retractor can be made compact.

Moreover, since the electronic control unit is disposed beside the upper stay adjacent to the exterior of the vehicle cabin, the electronic control unit integrated is covered with a vehicle component such as the center pillar and the upper stay of the frame. Therefore, even if the electronic control unit generates noise when activated by the driving of the motor, the noise can be block by the vehicle component and the upper stay. This prevents the noise from leaking from the interior of the center pillar to the exterior, thereby protecting the other electronic components of the vehicle from the noise generated from the electronic control unit.

Furthermore, since the electronic control unit is disposed on the same side as the motor with respect to the back board of the frame, the electronic control unit can be disposed close to the motor. This makes the seatbelt retractor compact and facilitates the electrical connection between the electronic control unit and the motor.

The electronic control unit is disposed beside the upper stay adjacent to the interior of the vehicle cabin. Even if the electronic control unit breaks down, only the electronic control unit can be detached and replaced with a normal electronic control unit without detaching the whole seatbelt retractor. Therefore, even when the electronic control unit is integrated with the seatbelt retractor, satisfactory workability of replacing the electronic control unit can be achieved.

Furthermore, since the upper stay has a belt guide, the vibration of the seatbelt can be reduced. Thus, not only the vibration of the seatbelt retractor but also the vibration of the seatbelt can be prevented more effectively.

The seatbelt device is configured so that the seatbelt retractor can be incorporated in small space such as the interior of the center pillars. This prevents the seatbelt retractor equipped with the motor and the electronic control unit from occupying the internal space of the vehicle cabin. This provides the occupant with preferable restraint by controlling the tension of the seatbelt by the motor, while ensuring the comfort of the occupants in the vehicle cabin.

BRIEF DESCRIPTION OF THE DRAWINGS

These and other features, aspects, and advantages of the present invention will become apparent from the following description, appended claims, and the accompanying exemplary embodiments shown in the drawings which are briefly described below.

DETAILED DESCRIPTION

Referring generally to the FIGURES, illustrated is a seatbelt unit with a seatbelt retractor that retracts the belt by rotating a spool by an electric motor. This type of seatbelt unit generally includes a seatbelt, whose belt anchor at one end is fixed to the floor of the vehicle body or a vehicle seat, a seatbelt retractor that retracts the seatbelt by rotating a spool by an electric motor, a guide anchor that guides the seatbelt withdrawn from the seatbelt retractor to an occupant's shoulder, a tongue slidably supported by the seatbelt that is guided from the guide anchor, and a buckle fixed to the floor of the vehicle body or the vehicle seat, with which the tongue is to be detachably insertion-engaged.

The seatbelt retractor includes a U-shaped frame having a back board and right and left walls and extending from both sides thereof, the seatbelt, the spool that is rotatably supported by the frame and retracts the seatbelt, a spring device that is supported by the frame and constantly urges the spooling in the retracting direction, the motor that is supported by the frame and serves as driving means for rotating the spool, a power transmission mechanism that is supported by the frame, converts the power of the motor, and transmits it to the spool, and a circuit board having a printed circuit that is supported by a cover disposed on the left side wall of the frame and controls the driving of the motor. The printed circuit of the circuit board is electrically connected to the motor and the power supply.

This seatbelt retractors has, on the right side wall of the frame, a known vehicle sensor (deceleration sensing mechanism) that is activated when deceleration larger than predetermined deceleration is applied to the vehicle during a crash, a known webbing sensor that is activated when the seatbelt is quickly withdrawn faster than a normal seatbelt withdrawing motion (seatbelt withdrawing motion when the occupant wears the seatbelt), and a known locking mechanism that is activated by the vehicle sensor or the webbing sensor to lock the rotation of the spool in the belt withdrawing direction.

The invention will now be discussed with reference to the FIGURES.

Figure 1:
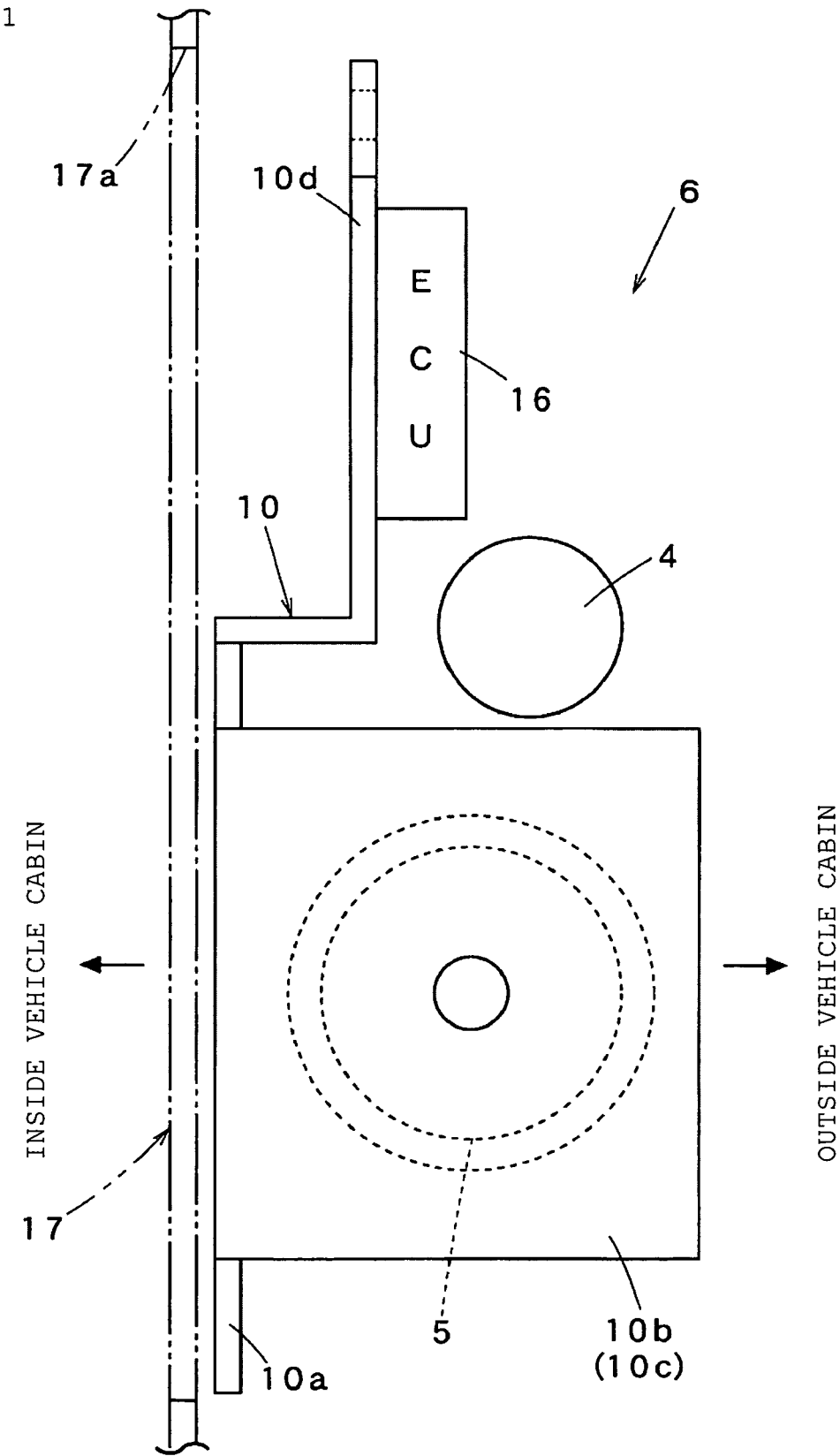
FIG. 1 is a schematic diagram of a seatbelt retractor according to an embodiment of invention.
Figure 2:
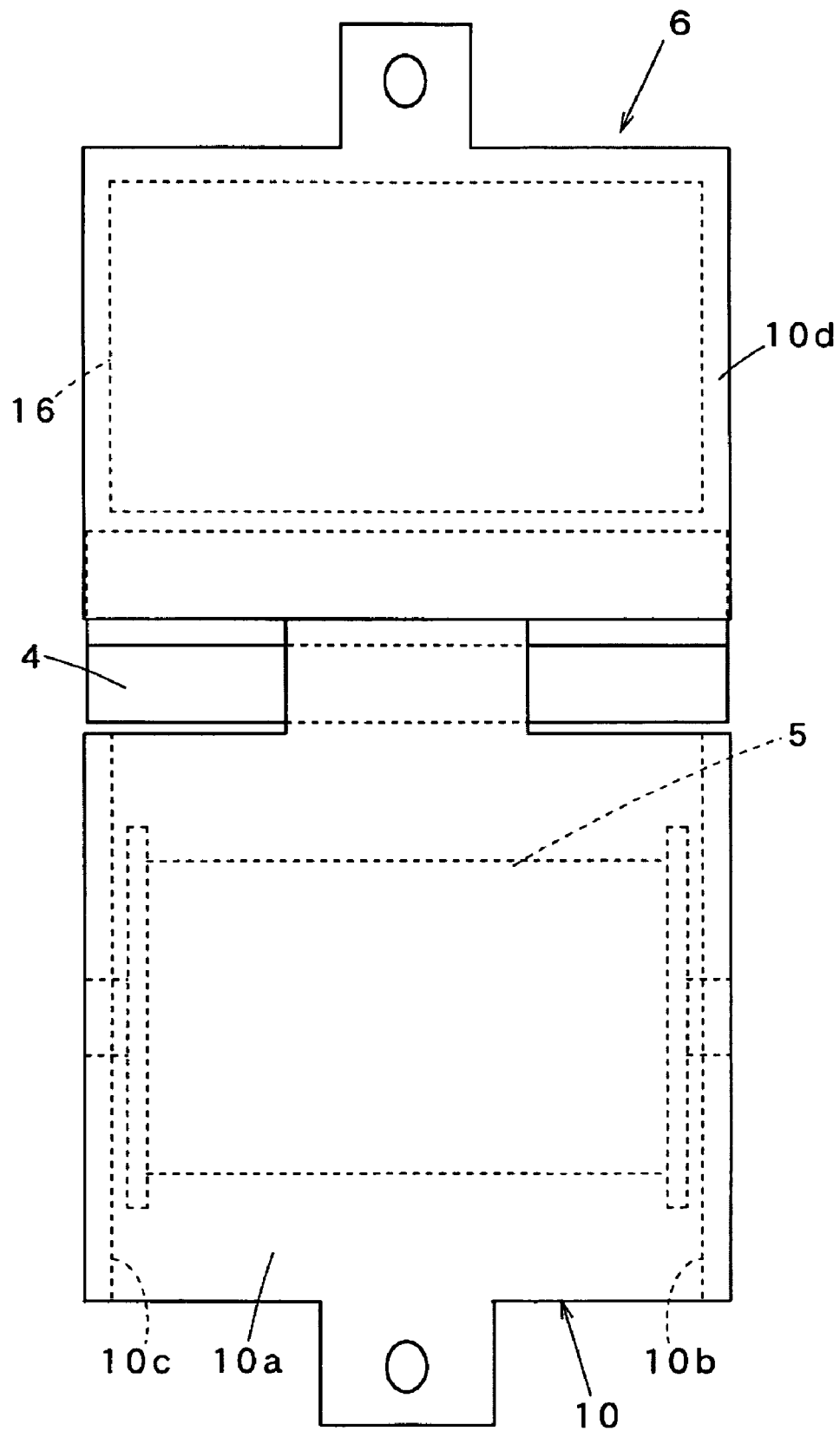
FIG. 2 is a left side view of FIG. 1.

According to an embodiment of invention, as shown in FIGS. 1 and 2, a seatbelt retractor 6 includes a metallic U-shaped frame 10 and a spool 5 that is rotatably supported by the right and left side walls 6b and 6c of the frame 10 and retracts a seatbelt. The seatbelt retractor 6 further has an electric motor 4 for rotating the spool 5 in both of the belt retracting direction and the belt withdrawing direction, and a plate-like electronic control unit (ECU) 16 for controlling the driving of the motor 4. Accordingly, the seatbelt retractor 6 of this embodiment performs the retraction and the withdrawal of the seatbelt by the driving force of the motor 4.

The motor 4 is disposed above both side walls 10b and 10c of the frame 10 and on the same side as the spool 5 with respect to a backboard 10a. The motor 4 is detachably fixed to at least one of the back board 10a and the both side walls 10b and 10c of the frame 10 in such a manner that its length (the axis of rotation of the motor 4) is in parallel to the axis of the spool 5.

The ECU 16 is detachably mounted to an upper stay 10d extending upward from the back board 10a of the frame 10 and to be mounted to the vehicle body. That is to say, the frame 10 and the upper stay 10d are integrally formed of a single metallic member. The frame 10 and the upper stay 10d may be formed separately. The ECU 16 is disposed close to the motor 4 so that the wiring for the electrical connection between the ECU 16 and the motor 4 is decreased in length, thus facilitating the connection. In this manner, the motor 4 and the ECU 16 are integrated with the seatbelt retractor 6.

Figure 10:
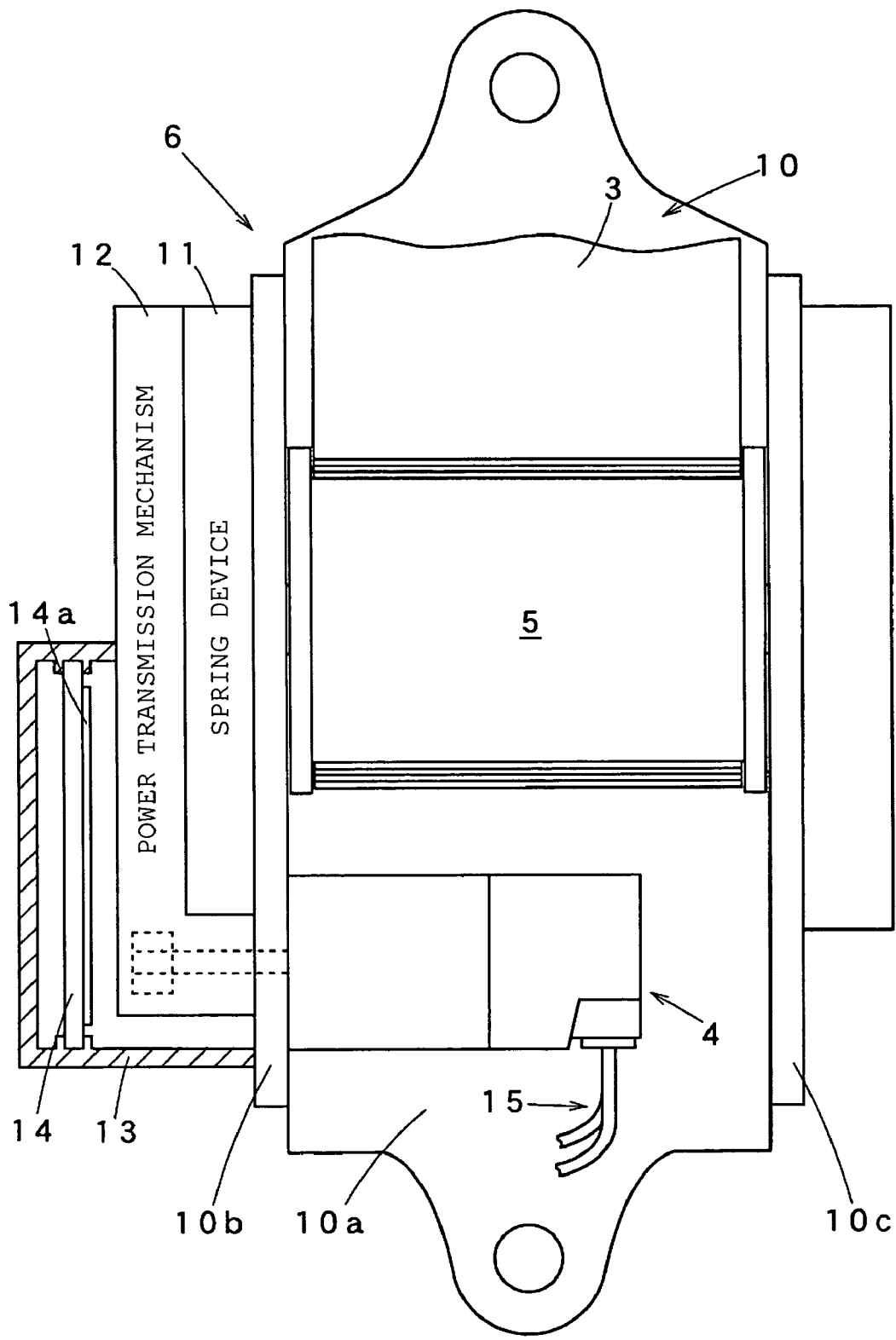
FIG. 10 is a schematic diagram of a seatbelt retractor used in the seatbelt unit shown in FIG. 9.

The other structures of the seatbelt retractor 6 according to this embodiment are substantially the same as those of the conventional one shown in FIG. 10.

The seatbelt retractor 6 is, as shown in FIG. 1, disposed in the internal space of a center pillar (corresponding to a vehicle component of the invention) 17 made of metal or the like, that is, beside the center pillar 17 adjacent to the exterior of the vehicle cabin in such a manner that the back board 10a of the frame 10 faces the interior of the vehicle cabin. Thus, most of the seatbelt retractor 6 integrated with the ECU 16 is covered with the center pillar 17. With the seatbelt retractor 6 integrated with the vehicle body, the ECU 16 faces the exterior of the vehicle cabin. Accordingly, the motor 4 is covered with the center pillar 17 and the back board 10a of the frame 10, so that it is not directly exposed to the vehicle cabin. The seatbelt retractor 6 is taken in and out of the internal space of the center pillar 17 through an opening 17a of the center pillar 17.

In the seatbelt retractor 6, the ECU 16 is disposed on the upper stay 10d to be mounted to the vehicle body. Therefore, the ECU 16 and the motor 4 can be disposed close to the position at which the seatbelt retractor 6 is mounted to the vehicle body. Accordingly, the weight of the ECU 16 integrated with the ECU 16 can be dispersed not only to the main body of the seatbelt retractor 6 but also to the upper stay 10d. This can reduce the weight of the seatbelt retractor 6 even when the ECU 16 is integrated with the seatbelt retractor 6. As a result, even if vibration is applied to the seatbelt retractor 6 integrated with the ECU 16, so that the seatbelt retractor 6 vibrates, the vibration can be reduced. In this way, the vibration of the seatbelt retractor 6 can be reduced.

Particularly, since the motor 4 is disposed above the both side walls 10b and 10c of the frame 10, the weight of the motor 4 can also be dispersed to the upper stay 10d in addition to the main body of the seatbelt retractor 6. This can further effectively reduce the vibration of the seatbelt retractor 6.

Moreover, since the ECU 16 is mounted to the upper stay 10d of the frame 10 to be mounted to the vehicle body, the structure can be simplified, so that even when integrated with the electronic control unit, the seatbelt retractor 6 can be made compact.

Moreover, since the ECU 16 is disposed beside the upper stay 10d adjacent to the exterior of the vehicle cabin, the ECU 16 integrated is covered with the center pillar 17 and the upper stay 10d of the frame 10. Therefore, even if the ECU 16 generates noise when activated by the driving of the motor 4, the noise can be blocked by the center pillar 17 and the upper stay 10d. This prevents the noise from leaking from the interior of the center pillar 17 to the exterior, thereby protecting the other electronic components of the vehicle from the noise generated from the motor 4 and the ECU 16.

Furthermore, since the ECU 16 is disposed on the same side as the motor 4 with respect to the back board 10a of the frame 10 (outside the vehicle cabin), the ECU 16 can be disposed close to the motor 4. This makes the seatbelt retractor 6 compact and facilitates the electrical connection between the ECU 16 and the motor 4.

Furthermore, since the ECU 16 and the motor 4 are disposed above the both side walls 10b and 10c of the frame 10, the dead space above the both side walls 10b and 10c can be used effectively.

The other operations and advantages of the seatbelt retractor 6 in this embodiment are substantially the same as those of the known seatbelt retractor in which the spool is driven by the motor.

Figure 3:
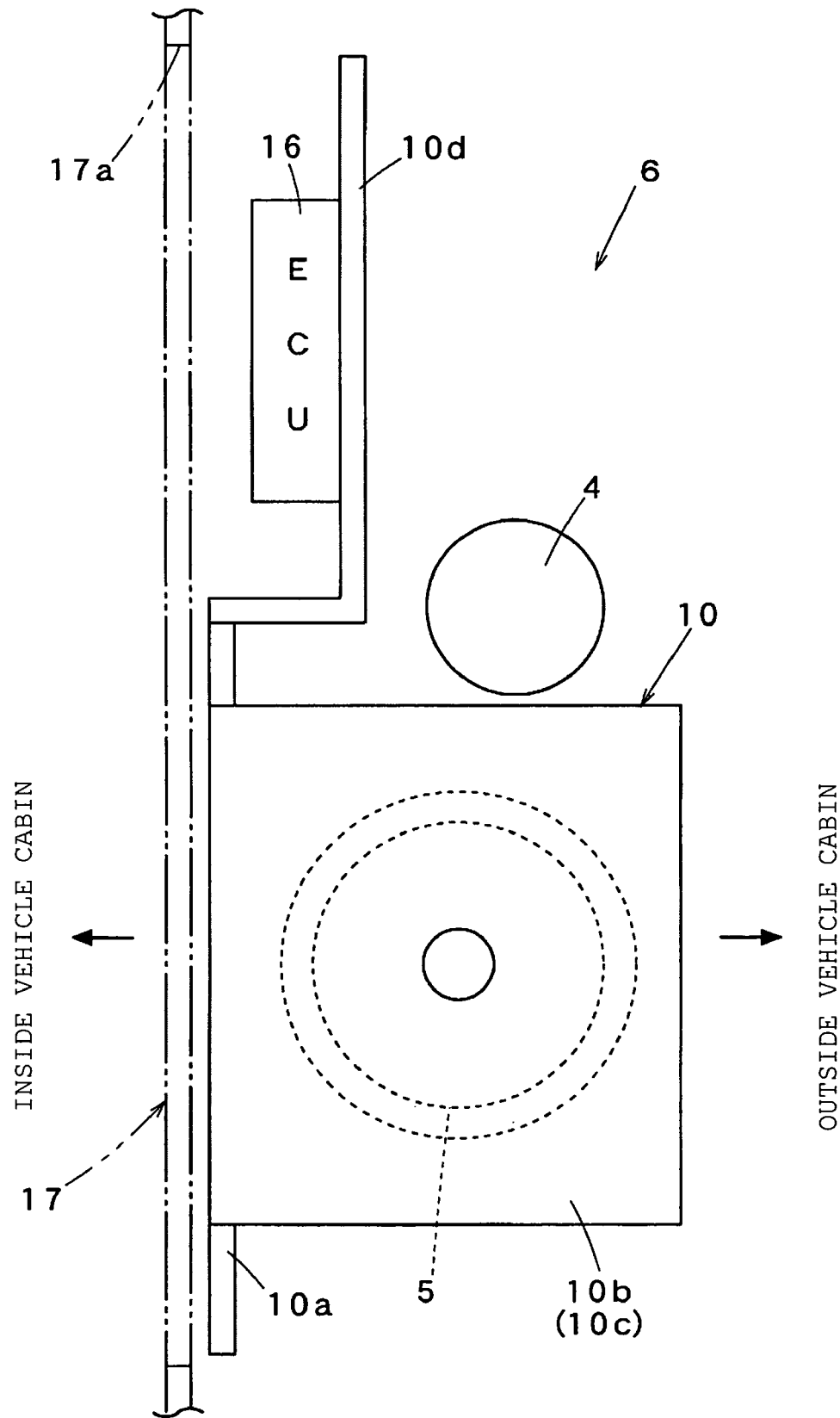
FIG. 3 is a schematic diagram of a seatbelt retractor according to another embodiment of invention.

Referring to FIG. 3 is a schematic diagram of a seatbelt retractor according to another embodiment of the invention.

In this embodiment, in the seatbelt retractor 6, the ECU 16 is disposed beside the upper stay 10d adjacent to the interior of the vehicle cabin. Accordingly, the ECU 16 faces the opening 17a of the center pillar 17, so that it faces the interior of the vehicle cabin.

The ECU 16 is thus opposed to the opening 17a of the center pillar 17 so as to face the interior of the vehicle cabin. Accordingly, if the ECU 16 breaks down, only the ECU 16 can be detached and replaced with a normal ECU 16 without detaching the whole seatbelt retractor 6. Therefore, even when the ECU 16 is integrated with the seatbelt retractor 6, satisfactory workability of replacing the ECU 16 can be achieved. However, this embodiment cannot provide the advantage of blocking the noise of the ECU 16.

Figure 4:
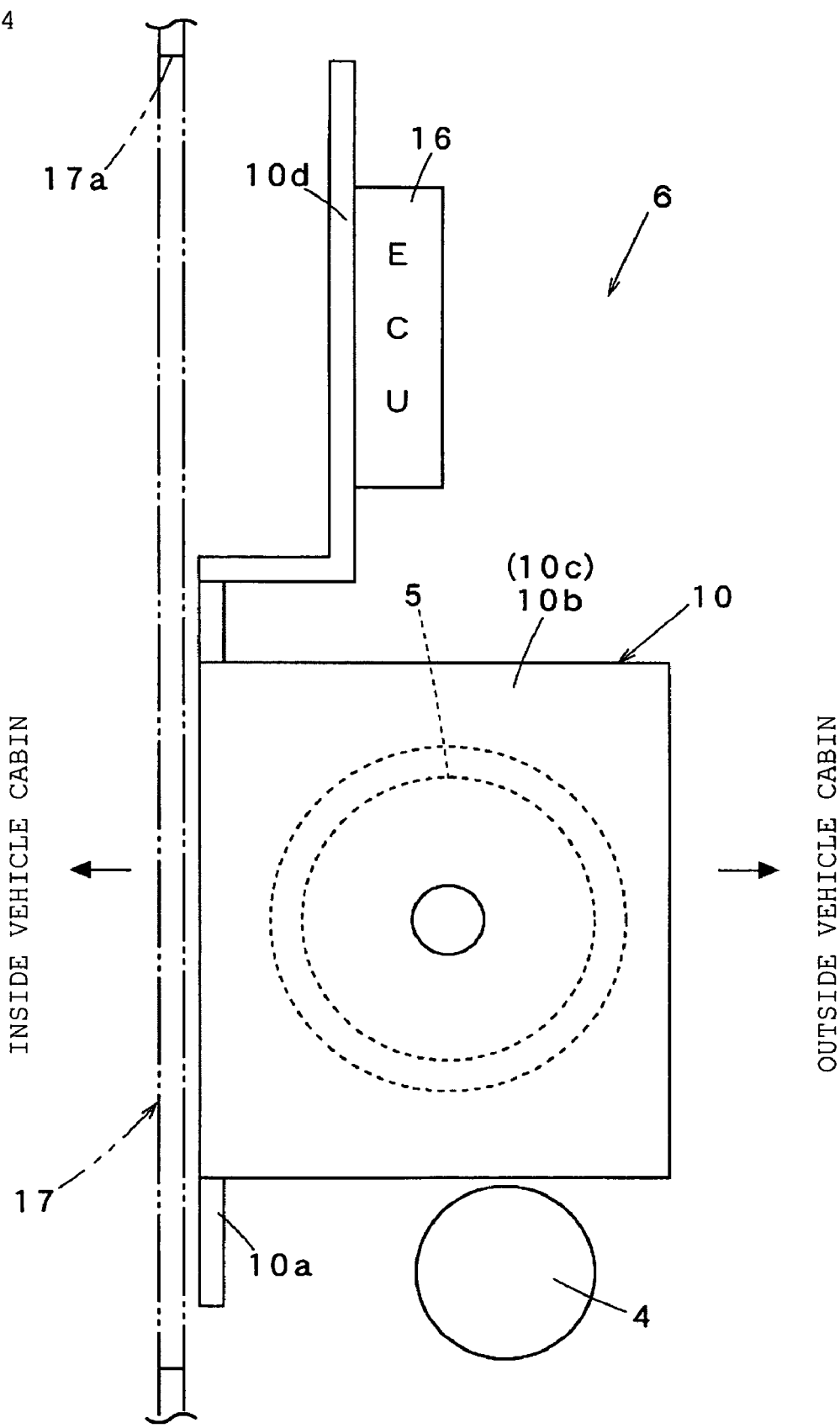
FIG. 4 is a schematic diagram of a seatbelt retractor according to another embodiment of invention.

Referring to FIG. 4, according to an embodiment of the invention, in the seatbelt retractor 6, the motor 4 is disposed below the both side walls 10b and 10c of the frame 10. In this case, the motor 4 is fixed to at least one of the back board 10a and the both side walls 10b and 10c of the frame 10.

Also the seatbelt retractor 6 has the ECU 16 above the both side walls 10b and 10c of the frame 10 and the motor 4 below the both side walls 10b and 10c of the frame 10. Accordingly, the dead spaces above and below the both side walls 10b and 10c can be used effectively.

Figure 5:
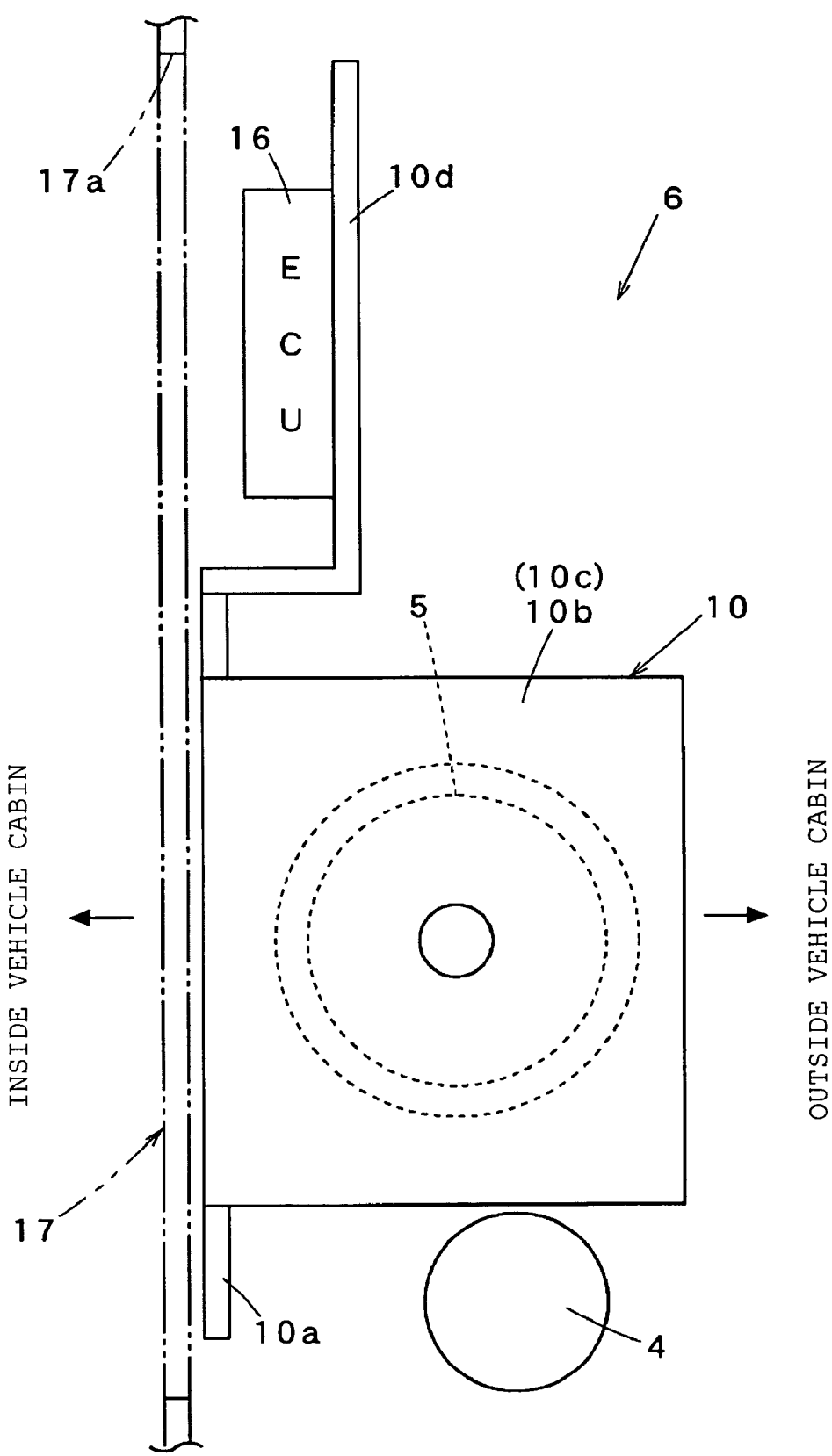
FIG. 5 is a schematic diagram of a seatbelt retractor according to another embodiment of invention.

FIG. 5 is a schematic diagram of a seatbelt retractor according to another embodiment of the invention.

In this embodiment, the motor 4 is fixed to at least one of the back board 10a and the both side walls 10b and 10c of the frame 10.

The seatbelt retractor 6 has the ECU 16 above the both side walls 10b and 10c of the frame 10 and the motor 4 below the both side walls 10b and 10c of the frame 10. Accordingly, the dead spaces above and below the both side walls 10b and 10c can be used effectively.

Figure 6:
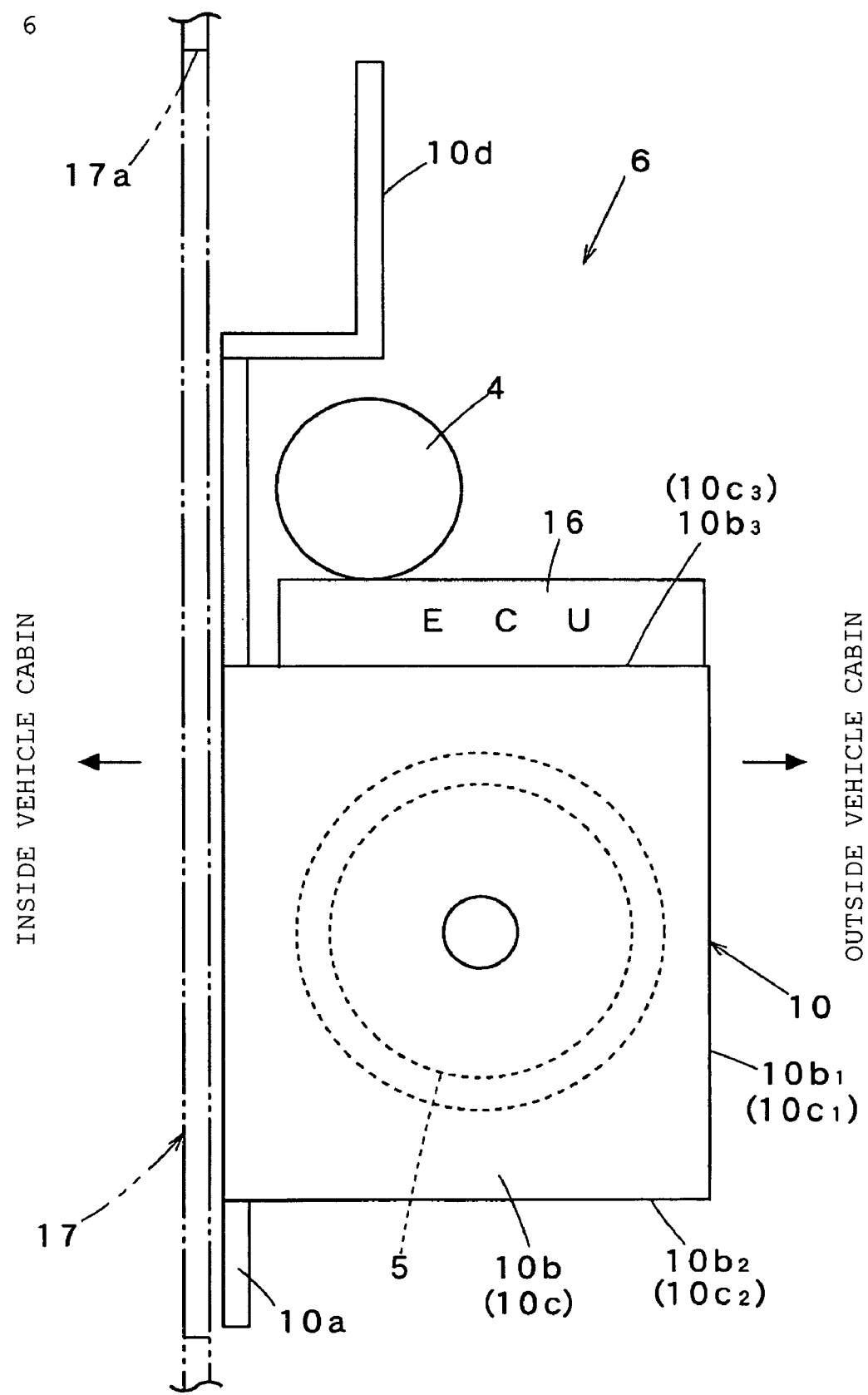
FIG. 6 is a schematic diagram of a seatbelt retractor according to another embodiment of invention.

FIG. 6 is a schematic diagram of a seatbelt retractor according to another embodiment of the invention.

In this embodiment, as shown in FIG. 6, in the seatbelt retractor 6, the ECU 16 is disposed between the upper rims 10b3 and 10c3 of the both side walls 10b and 10c of the frame 10, and the motor 4 is fixed to the upper surface of the case of the ECU 16.

In the seatbelt retractor 6, the ECU 16 and the motor 4 are disposed on the frame 10 adjacent to the upper stay 10d of the frame 10 to be mounted to the vehicle body. Therefore, the ECU 16 and the motor 4 can be disposed close to the position at which the seatbelt retractor 6 is mounted to the vehicle body. Therefore, even if the ECU 16 and the motor 4 are integrated with the seatbelt retractor 6, the weights of the ECU 16 and the motor 4 can be dispersed not only to the both side walls 10b and 10c but also to the upper stay 10d.

Figure 7:
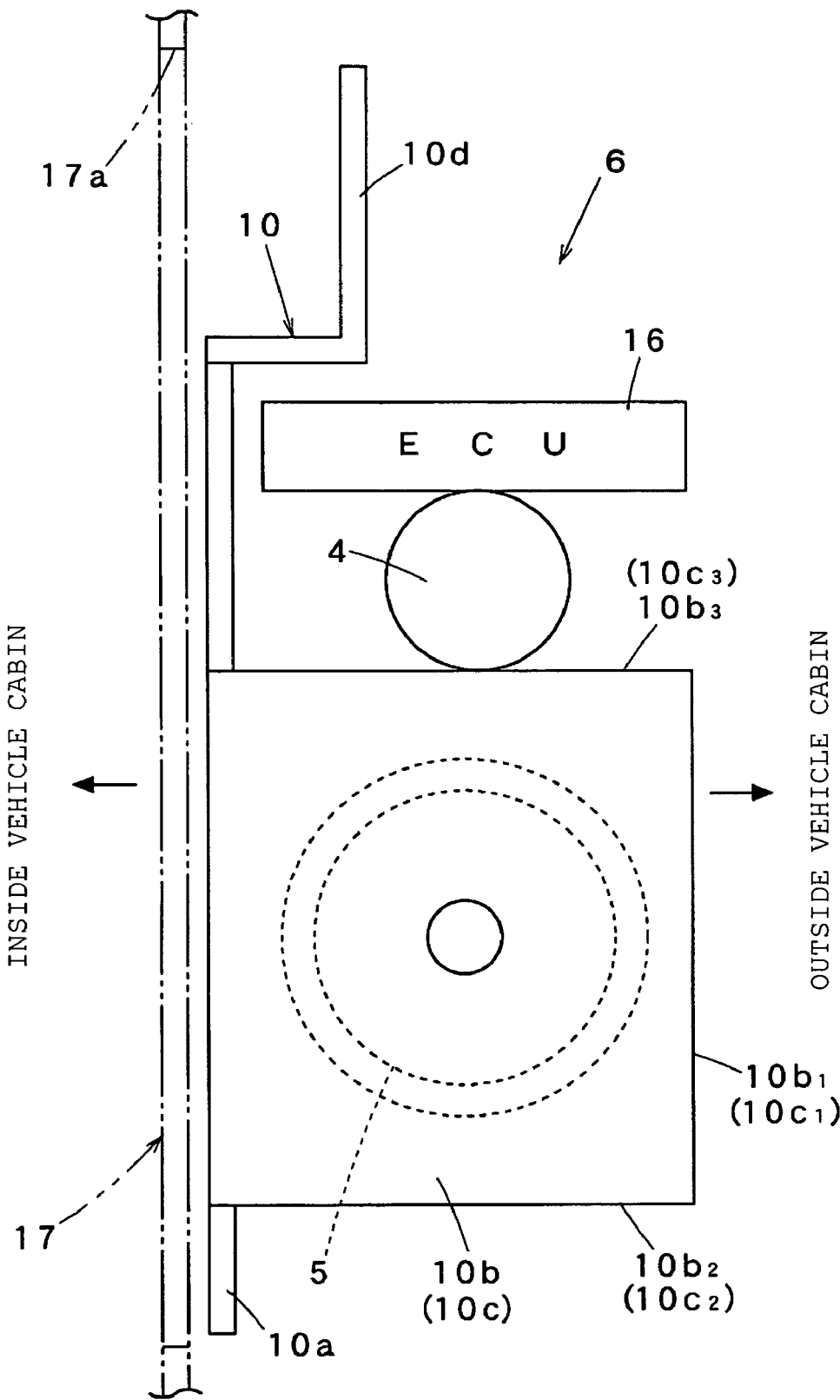
FIG. 7 is a schematic diagram of a seatbelt retractor according to another embodiment of invention.

Referring to FIG. 7 is a schematic diagram of a seatbelt retractor according to a yet another embodiment of the invention.

As shown in FIG. 7, in the seatbelt retractor 6, the motor 4 is disposed between the upper rims 10b3 and 10c3 of the both side walls 10b and 10c of the frame 10, and the ECU 16 is fixed to the upper surface of the case of the motor 4.

Figure 8:
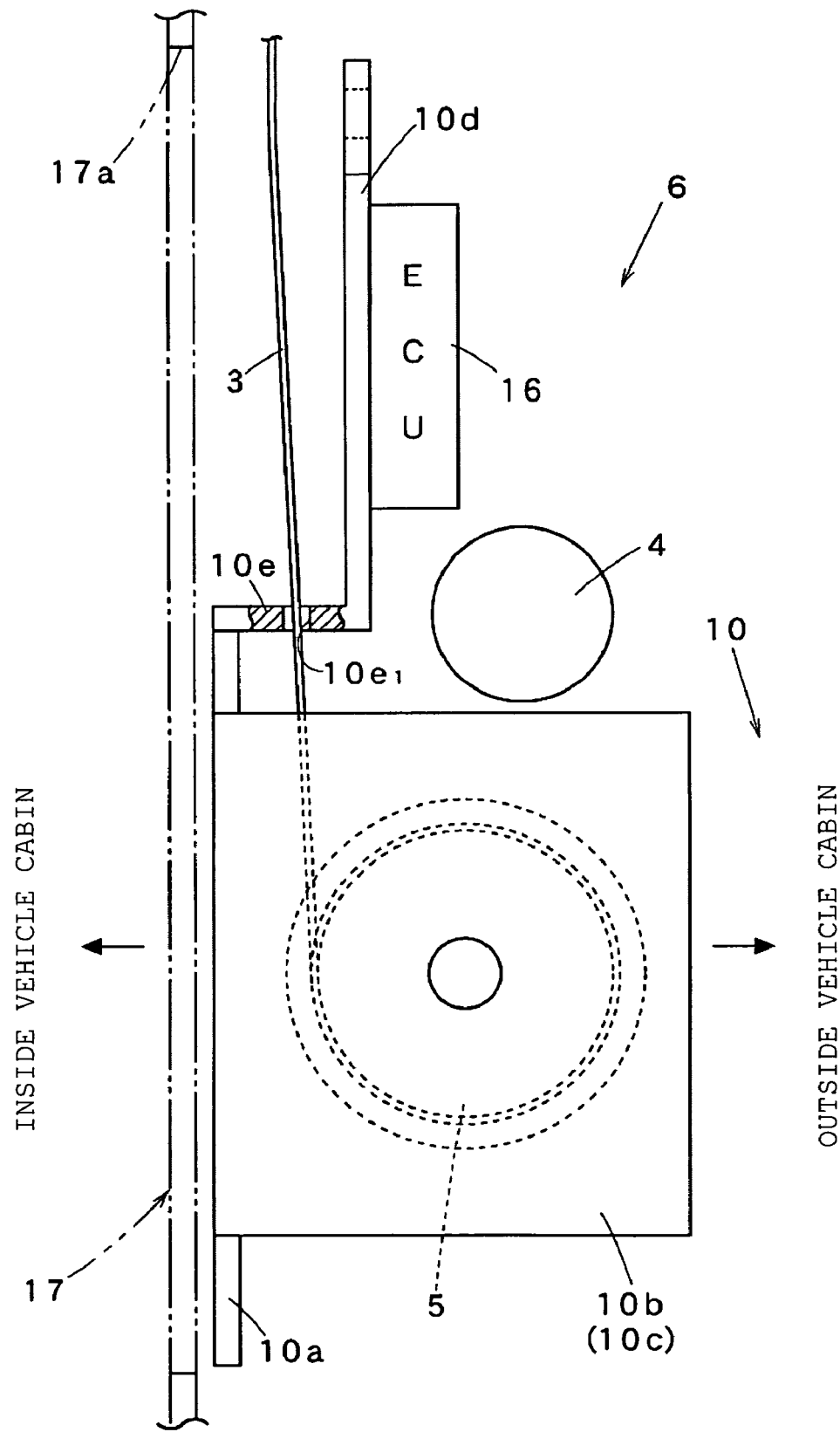
FIG. 8 is a schematic diagram of a seatbelt retractor according to according to another embodiment of invention.

FIG. 8 is a schematic diagram of a seatbelt retractor according to yet another embodiment of the invention.

As shown in FIG. 8, in the seatbelt retractor 6, the upper stay 10d shown in FIG. 1 is provided with a belt guide 10e having a belt guide hole 10e1 for the seatbelt 3 to pass through. The belt guide 10e reduces the vibration of the motor 4. Accordingly, the vibration of the seatbelt retractor 6 can be reduced, as described above, and also the vibration of the seatbelt 3 can be reduced more effectively.

The seatbelt retractor of the invention is not limited to the foregoing embodiments. Only the retraction of the seatbelt can be performed by the driving force of the motor, as described herein, or alternatively, only the withdrawal of the seatbelt can be performed by the driving force of the motor. That is to say, the seatbelt retractor of the invention performs at least one of the retraction and withdrawal of the seatbelt.

Figure 9:
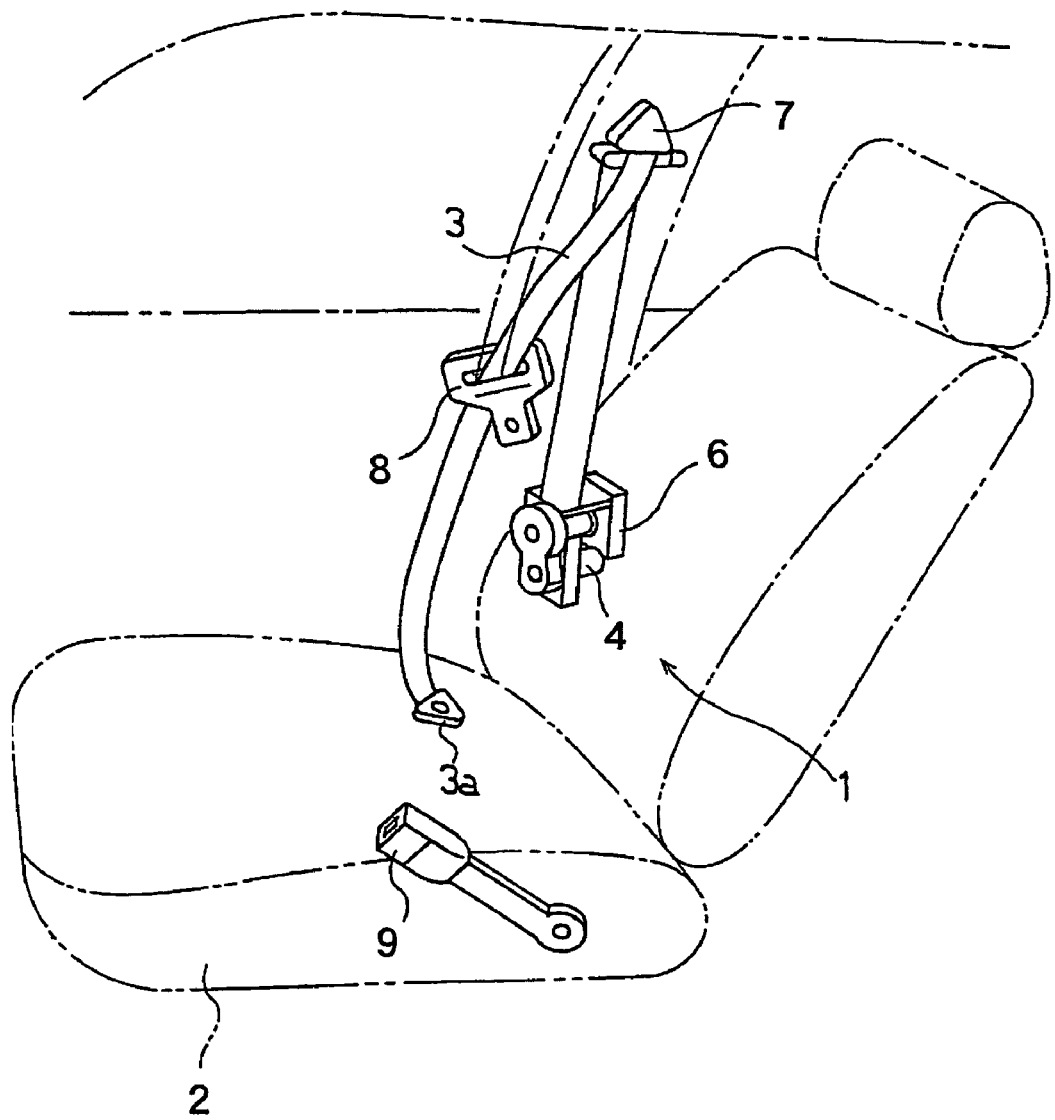
FIG. 9 is a schematic diagram of a conventional seatbelt unit.

The seatbelt retractors 6 according to the embodiments shown in FIGS. 1-8 can be applied to the seatbelt retractor 6 of the conventional three-point seatbelt unit 1 shown in FIG. 9, for example.

The seatbelt unit 1 provided with the seatbelt retractor 6 of the invention is such that the seatbelt retractor 6 is so compact that it can be incorporated in small space such as the interior of the center pillar. This prevents the seatbelt retractor 6 equipped with the motor 4 and the ECU 16 from occupying the internal space of the vehicle cabin. This provides the occupant with preferable restraint by controlling the tension of the seatbelt 3 by the motor 4, while ensuring the comfort of the occupants in the vehicle cabin.

The seatbelt retractor and the seatbelt unit of the invention are suitable for a seatbelt retractor that performs at least one of retraction and withdrawal of the seatbelt by controlling the rotation of the spool by the motor, and for a seatbelt unit having the same.

The priority application, Japanese Patent Application No. 2007-218475, filed Aug. 24, 2007 including the specification, drawings, claims and abstract, is incorporated herein by reference in its entirety.

It is important to note that the construction and arrangement of the seat belt retractor and seat belt apparatus as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the description. For example elements shown as integrally formed may be constructed of multiple parts or elements, the position of the elements may be reversed or otherwise varied, and the nature or number of discrete elements or positions may be altered or varied. Other substitutions, modifications, changes and omissions may be made in the design, operating conditions and arrangement of the exemplary embodiments.

What is claimed is:

1. A seatbelt retractor comprising:
    at least a frame having a back board and two side walls extending from two side rims of the back board;

a spool rotatably supported by the frame and for retracting a seatbelt;

a motor for rotating the spool;

an electronic control unit for controlling the driving of the motor; and an upper stay extending upward from the backboard at an upper part of the frame and being configured to be mounted to a vehicle body, wherein the electronic control unit is disposed above both side walls of the frame and mounted to a vertical surface of the upper stay.

2. The seatbelt retractor according to claim 1, wherein the electronic control unit is disposed on a vertical surface of the upper stay adjacent to an interior of a vehicle cabin or an exterior of the vehicle cabin.

3. The seatbelt retractor according to claim 2, wherein the upper stay includes a belt guide for guiding the seatbelt.

4. The seatbelt retractor according to claim 1, wherein the upper stay includes a belt guide for guiding the seatbelt.

5. A seatbelt unit comprising:

a seatbelt retractor including at least a frame having a back board and two side walls extending from two side rims of the back board; wherein the retractor further includes a spool rotatably supported by the frame and for retracting a seatbelt, a motor for rotating the spool in order to perform at least one of retraction and withdrawal of the seatbelt, an upper stay extending upward from the backboard at an upper part of the frame and being configured to be mounted to a vehicle body, and an electronic control unit for controlling the driving of the motor, wherein the electronic control unit is disposed above both side walls of the frame and mounted to a vertical surface of the upper stay;

a tongue slidably supported by the seatbelt that is withdrawn from the seatbelt retractor; and a buckle to be detachably engaged with the tongue, wherein the seatbelt restrains the occupant by the engagement of tongue and the buckle.

6. The seatbelt unit according to claim 5, wherein the electronic control unit is disposed on a vertical surface of the upper stay adjacent to an interior of a vehicle cabin or an exterior of the vehicle cabin.

7. The seatbelt unit according to claim 6, wherein the upper stay includes a belt guide for guiding the seatbelt.

8. The seatbelt unit according to claim 5, wherein the upper stay includes a belt guide for guiding the seatbelt.

* * * * *